United States Patent
Ueda

(10) Patent No.: US 12,271,644 B2
(45) Date of Patent: Apr. 8, 2025

(54) CONTROL METHOD FOR INFORMATION PROCESSING APPARATUS, INFORMATION PROCESSING APPARATUS, AND STORAGE MEDIUM

(71) Applicant: CANON KABUSHIKI KAISHA, Tokyo (JP)

(72) Inventor: Yuri Ueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/150,231

(22) Filed: Jan. 5, 2023

(65) Prior Publication Data

US 2023/0229370 A1   Jul. 20, 2023

(30) Foreign Application Priority Data

Jan. 17, 2022   (JP) ................................ 2022-005348

(51) Int. Cl.
    *G06F 3/12* (2006.01)

(52) U.S. Cl.
    CPC .......... *G06F 3/1252* (2013.01); *G06F 3/1204* (2013.01); *G06F 3/1208* (2013.01); *G06F 3/1256* (2013.01)

(58) Field of Classification Search
    None
    See application file for complete search history.

(56) References Cited

U.S. PATENT DOCUMENTS

| | | | |
|---|---|---|---|
| 10,956,763 B2* | 3/2021 | Sakashita | H04N 1/00411 |
| 11,406,746 B2* | 8/2022 | Neftel | A61M 1/282 |
| 11,419,662 B2* | 8/2022 | Holst | A61B 18/1206 |
| 2006/0087700 A1* | 4/2006 | Kishi | H04N 1/3873 |
| | | | 358/453 |
| 2010/0162106 A1* | 6/2010 | Ikazaki | G03G 15/502 |
| | | | 715/730 |
| 2012/0144296 A1* | 6/2012 | Rao | G07F 7/1008 |
| | | | 715/273 |
| 2013/0057891 A1* | 3/2013 | Aoki | H04N 1/387 |
| | | | 358/1.13 |
| 2015/0212771 A1* | 7/2015 | Hori | G06F 3/1242 |
| | | | 358/1.18 |
| 2015/0265072 A1* | 9/2015 | Ridless | B44D 3/185 |
| | | | 40/773 |

(Continued)

FOREIGN PATENT DOCUMENTS

JP   6531542 B2   6/2019

*Primary Examiner* — Helen Zong
(74) *Attorney, Agent, or Firm* — Venable LLP

(57) ABSTRACT

A control method for an information processing apparatus is provided. The method comprises receiving a designation of a number of divisions of an image; after a designation of a number of divisions equivalent to a first number has been received, executing predetermined processing related to a number of divisions equivalent to a second number different from the first number based on at least one of whether a specific region of the image is divided in the first number of divided images, which correspond to the image that has been divided by the number of divisions equivalent to the first number, and a percentage that a predetermined region in each of the first number of the divided images accounts for in the specific region; and after the predetermined processing, executing processing for printing a plurality of divided images corresponding to the divided.

17 Claims, 9 Drawing Sheets

(56) References Cited

U.S. PATENT DOCUMENTS

| | | | |
|---|---|---|---|
| 2021/0173600 A1* | 6/2021 | Hayashi | G06F 3/1242 |
| 2022/0121884 A1* | 4/2022 | Zadeh | G06V 10/764 |
| 2022/0254321 A1* | 8/2022 | Ogiso | G09G 5/395 |
| 2022/0270572 A1* | 8/2022 | Ogiso | H04N 21/431 |
| 2022/0377255 A1* | 11/2022 | Shibuya | H04N 1/393 |
| 2023/0122874 A1* | 4/2023 | Gupta | G06F 18/24 |
| | | | 707/723 |

* cited by examiner

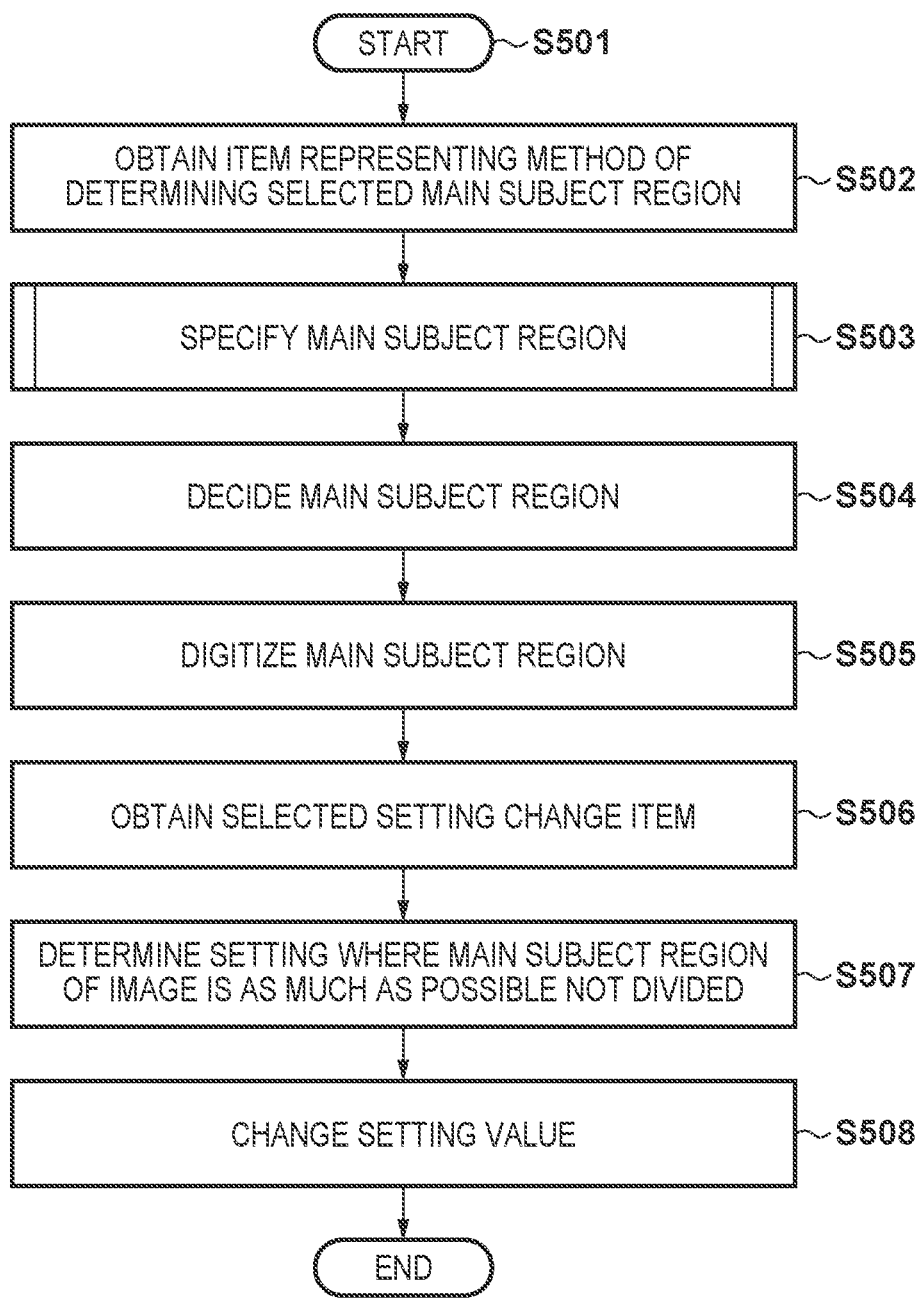

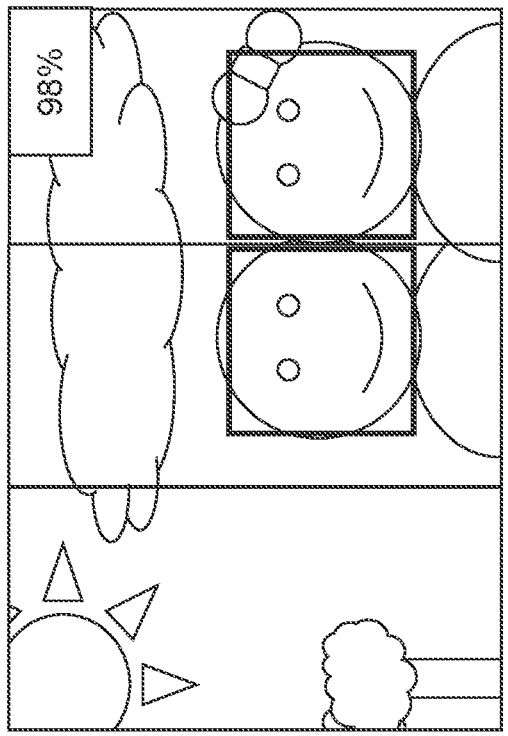
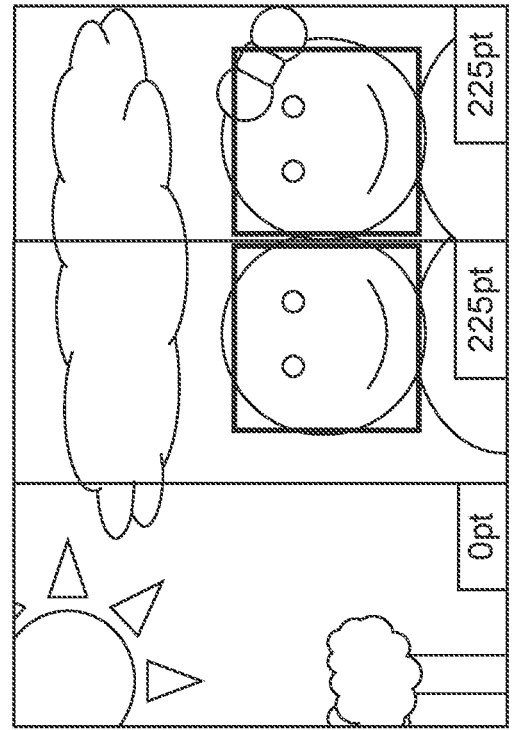
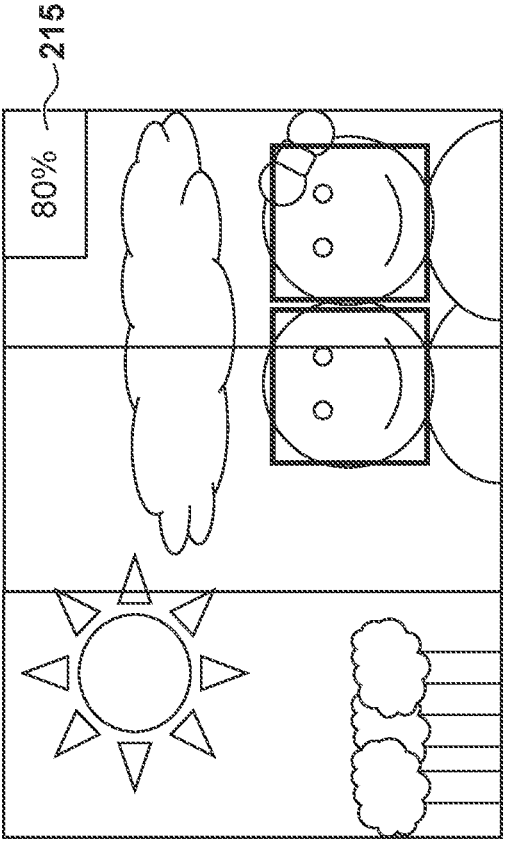
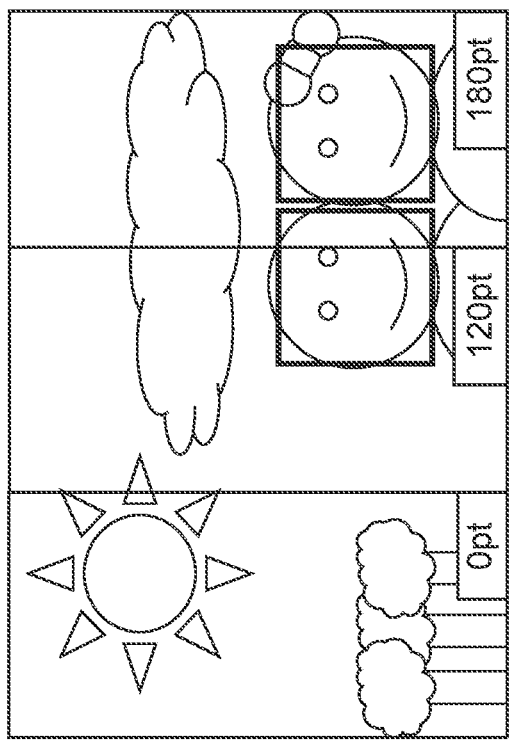

CONTROL METHOD FOR INFORMATION PROCESSING APPARATUS, INFORMATION PROCESSING APPARATUS, AND STORAGE MEDIUM

BACKGROUND OF THE INVENTION

Field of the Invention

The present invention relates to a control method for an information processing apparatus, an information processing apparatus, and a storage medium.

Description of the Related Art

There is a method in which one image is divided and printed on small pieces of paper, and the pieces of paper with the image printed thereon are joined and fastened, thereby creating a large print product. In recent years, this method has been used for such purposes as placement of a divided and enlarged poster in a store, and private interior display and leisurely viewing of a divided gallery wrap whereby an image that has been divided and printed is attached to a wooden frame for display. Here, a gallery wrap denotes a finishing style whereby, in binding an image (e.g., a photograph) and a frame together, the image is printed in a size larger than the frame size, and the image wraps around the side surfaces of the frame. A divided gallery wrap denotes the result of dividing one image into a plurality of partial images and finishing each partial image as a gallery wrap.

In a divided gallery wrap, individual gallery wrap pieces are displayed with a gap therebetween; thus, it is desired that a main subject be undivided as much as possible and an image have a great appearance with a large part of an undivided main subject region included in a partial image. Therefore, in order to adjust the position of the main subject region and the dividing positions, it is necessary to adjust many settings, such as the number of divisions, the image positions, and the enlargement/reduction factor. Not only in the case of a binding method like a divided gallery wrap, but also in the case where an image, such as a photograph, is divided as in printing of a poster and the like, the need for the adjustment of settings can similarly arise because there are connection portions between partial images.

A method of Japanese Patent No. 6531542 is known as a technique to change the setting values of an image in accordance with data information of the image.

According to the method of Japanese Patent No. 6531542, an image is divided in accordance with a designated division condition, and the setting values for contrast in each region are adjusted in accordance with transmission information of each region. While the prior art document changes the settings of the divided image on a per-region basis, it does not change the number of divisions designated before the division, or change the settings of a single original image before the division. The technique of Japanese Patent No. 6531542 causes the settings to be changed on a per-region basis after the division, and is thus not suitable in creating a piece of work in which the appearance of a single original image is valued. Therefore, it has not solved the problem that a plurality of settings need to be adjusted with respect to one image. There is also a problem that it is not possible to quantitatively confirm how much of a main subject region to be emphasized was included in one partial image while performing the division.

SUMMARY OF THE INVENTION

The present invention makes it possible to divide an image and configure the settings of the divided image through a simple operation, and realizes image division with a great appearance.

An information processing apparatus of the present invention has the following configuration.

Specifically, according to one aspect of the present invention, provided is a control method for an information processing apparatus, comprising: receiving a designation of a number of divisions of an image from a user; after a designation of a number of divisions equivalent to a first number has been received from the user, executing predetermined processing related to a number of divisions equivalent to a second number different from the first number based on at least one of whether a specific region of the image is divided in the first number of divided images, which correspond to the image that has been divided by the number of divisions equivalent to the first number, and a percentage that a predetermined region in each of the first number of the divided images accounts for in the specific region; and after the predetermined processing has been executed, executing processing for printing a plurality of divided images corresponding to the image that has been divided.

The present invention makes it possible to divide an image and configure the settings of the divided image through a simple operation, and realizes image division with a great appearance.

Further features of the present invention will become apparent from the following description of exemplary embodiments with reference to the attached drawings.

BRIEF DESCRIPTION OF THE DRAWINGS

FIG. 5A and FIG. 5B are flowcharts for weighting an image and changing image settings.

FIG. 6A, FIG. 6B, FIG. 6C, and FIG. 6D are diagrams showing examples of a screen that displays a numerical value of a main subject region.

DESCRIPTION OF THE EMBODIMENTS

Figure 1:
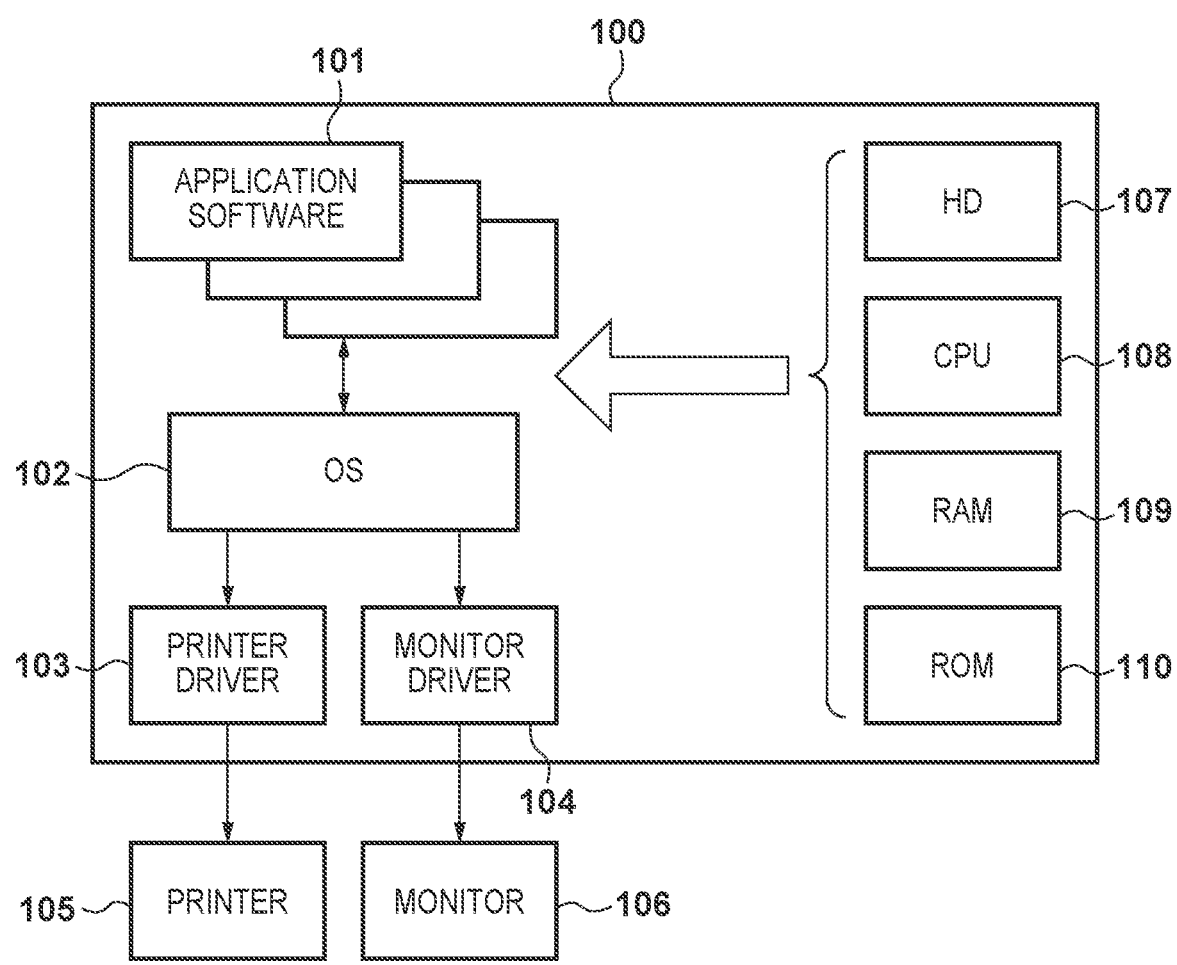
FIG. 1 is a block diagram showing a schematic configuration of an information processing system that serves as a typical example of embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

System Configuration

FIG. 1 is a block diagram showing a configuration of a host computer, which is one example of an information processing apparatus. A printer 105 and a monitor 106 are connected to a host computer 100. The host computer 100 includes items of application software 101, such as a word processor, a spreadsheet, and an Internet browser. The application software 101 may also be referred to as applications 101. A group of various types of rendering processing instructions that is issued by the application software 101 and indicates an output image is input to a monitor driver 104 via an operating system (OS) 102. The group of various types of rendering processing instructions includes an image rendering instruction, a text rendering instruction, and a graphics rendering instruction. Also, when printing is to be performed, this group of rendering instructions is also input to a printer driver 103 via the OS 102. The printer driver 103 is software for processing this group of rendering instructions, generating print data, and causing the printer 105 to perform printing. Also, the monitor driver 104 is software for processing this group of rendering instructions and causing the monitor 106 to display an image.

The host computer 100 includes items of hardware, such as a CPU 108, a hard disk (HD) 107, a RAM 109, and a ROM 110, in order to store the aforementioned software and cause the same to function. Also, an image processing system, as a whole, has a mode in which no particular application software with a printing function is installed in the host computer 100, and the monitor 106 and the printer 105 are connected.

In the host computer 100, the application software 101 generates output image data with use of, for example, text data of characters and the like, graphics data of figures and the like, and image data of a photographic image and the like. Then, the output image data is displayed on the monitor 106. Also, in a case where an image based on the output image data is to be printed, the application software 101 issues a print output request to the OS 102. Then, it issues, to the OS 102, a group of rendering instructions composed of a text rendering instruction representing a text data portion, a graphics rendering instruction representing a graphics data portion, and an image rendering instruction representing an image data portion.

Print Settings Screen

Figure 2A:
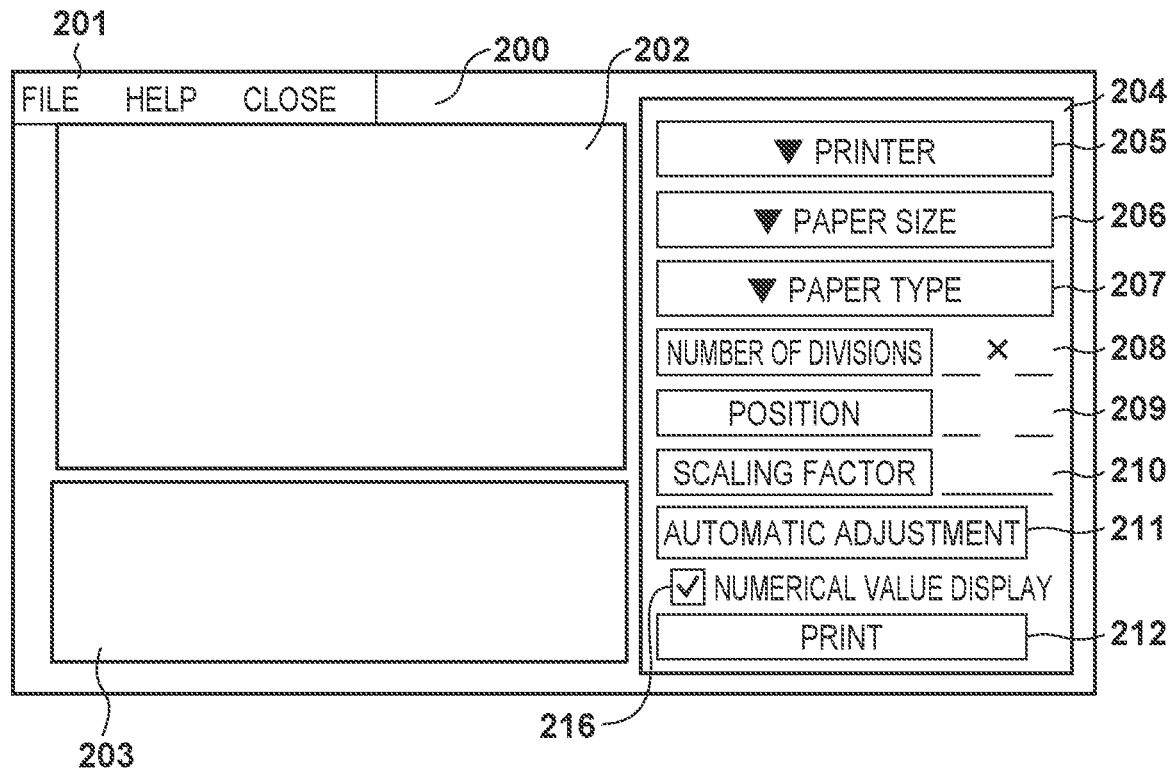
FIG. 2A, FIG. 2B, and FIG. 2C are diagrams showing examples of a screen configuration of an application that has a function of arranging images on a preview and editing the same.

FIG. 2A is a diagram showing one example of a screen configuration of a print settings screen 200, which is displayed by the application software 101 and is for inputting print settings. The print settings screen 200 includes a preview in which target images that are to be processed (to be printed) are arranged. The print settings screen 200 includes a menu operation unit 201, a preview region 202, a preview image selection region 203, a settings region 204, a printer selection pull-down 205, a paper size selection pull-down 206, and a paper type selection pull-down 207. The print settings screen 200 further includes a division number input region 208, a position input region 209, an enlargement/reduction factor (also referred to as a scaling factor) input region 210, an enlargement/reduction factor automatic adjustment button 211, and a print button 212.

The menu operation unit 201 includes an operation unit for selecting such functions as termination of the application software 101, designation of an image file to be added to the preview, and display of help. The preview region 202 is a region that displays an image to be previewed. In a case where image division has been set, the preview region 202 can also display one image selected by the preview image selection region 203 from among a plurality of images after the image division. The printer selection pull-down 205, the paper size selection pull-down 206, and the paper type selection pull-down 207 are regions for displaying and configuring settable values with respect to a printer, a paper size, and a paper type, respectively. A description of the settable values is omitted herein.

The division number input region 208 is a region for setting the number of divisions of an image by way of an input, and accepts the inputs of numerical values for the vertical direction and the horizontal direction, respectively. The position input region 209 is a region for setting, for example, the numerical value of the position of the upper-left corner of a region to be selected from the original image (e.g., a region to be displayed) (also referred to as an image display start position) by way of an input. This region accepts the inputs of numerical values for the vertical direction (downward) and the horizontal direction (leftward), respectively. These numerical values are represented, for example, under the assumption that the upper-left corner of the original image serves as an origin, that is to say, a base point (or a base position). Initially, the base position may be (0, 0), which corresponds to the point on the upper-left corner of the original image. Note that although the upper-left corner of the image serves as the origin in the present embodiment, the origin may not be limited to being located at the upper left. For example, the origin may be located at the upper right, the lower left, the lower right, the center of the image, or the like. Also, the image display start position may be designated on a preview image; in this case, the image display start position designated by a pointing device or the like may be displayed on the position input region 209. If the designated position is a position to designate the point on the upper-left corner of the image of the selected region, the regions that are located above and to the left of the designated position may be eliminated. Moreover, further designating the point on the lower-right corner, in addition to the point on the upper-left corner, may enable the removal of the right side and the lower side of that point.

The enlargement/reduction factor input region 210 is a region for setting the numerical value of the image enlargement/reduction factor by way of an input, and accepts the input of the numerical value of the enlargement/reduction factor. Note that although the enlargement/reduction factor (or the variable magnification factor or the magnification factor) is designated in the present example, the size after the variable magnification may be designated. Also, the reduction factors and sizes may be able to be designated for the horizontal and vertical directions, respectively. As a result of depressing the enlargement/reduction factor automatic adjustment button 211, an automatic adjustment item selection screen shown in FIG. 4 (also referred to as an item selection screen) is displayed. Note that the "depressing" or "pressing" operation may refer to touching in the case of a touchscreen, and may refer to clicking in the case of a coordinate input apparatus, such as a mouse.

Depressing the print button 212 issues a print instruction for printing every post-division image displayed in the preview image selection region 203 in accordance with the set contents. The print instruction is issued to the OS 102; as a result, a print job generated by the printer driver 103 is transmitted to the printer 105, and the printer 105 performs printing. Note that the print settings at this time are the settings that have been configured with use of the above-described printer selection pull-down 205, paper size selection pull-down 206, paper type selection pull-down 207, division number input region 208, position input region 209, and enlargement/reduction factor input region 210.

Figure 2B:
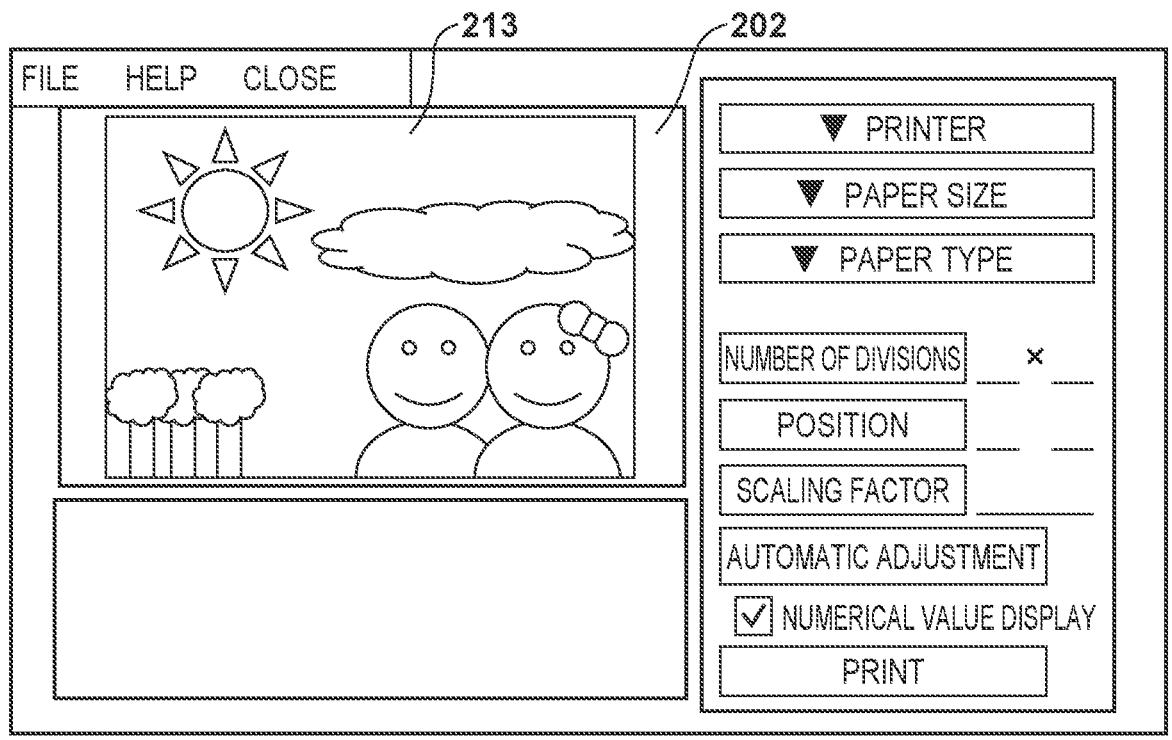

FIG. 2B is a diagram showing one example of a state where the applications 101 have recognized that an image has been inserted in the preview region 202 as a result of performing a file selection or drag-and-drop with use of the menu operation unit 201, and an image 213 is displayed in the preview region 202.

Figure 2C:
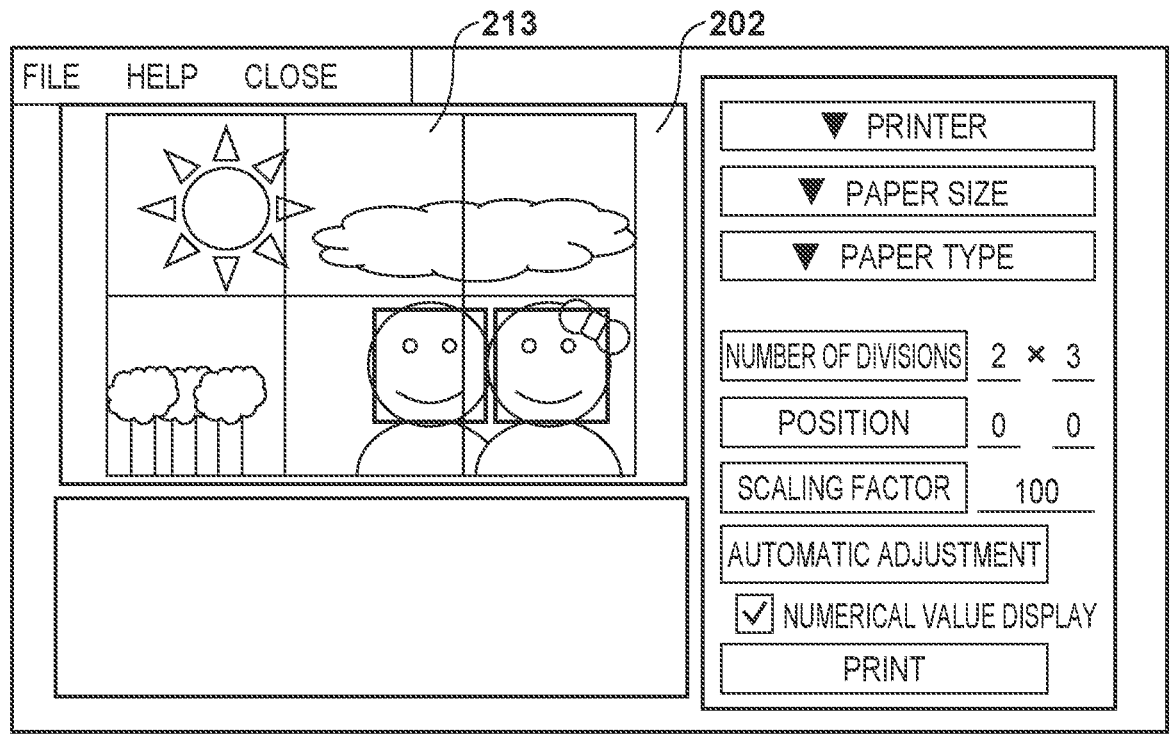

FIG. 2C shows a display example for a case where, in the state of FIG. 2B, a numerical value larger than 1 has been input to the division number input region 208 as the number of divisions in the vertical direction or the horizontal direction. Once the application software 101 has recognized that a number larger than 1 has been input to the division number input region 208 as the number of divisions in the vertical or horizontal direction, the image 213 is divided in accordance with the designation while being displayed in the preview region 202.

Figure 3:
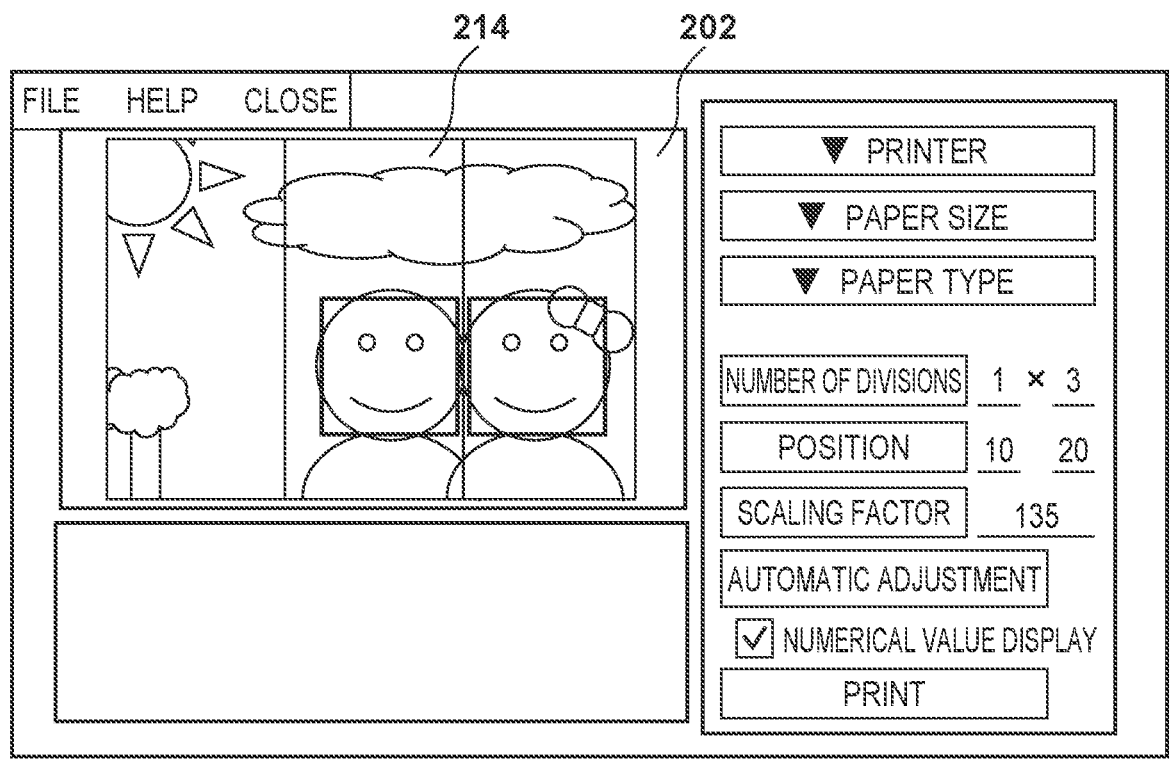
FIG. 3 is a diagram showing an example of a screen that displays an image after the automatic adjustment of settings has been applied.
Figure 4:
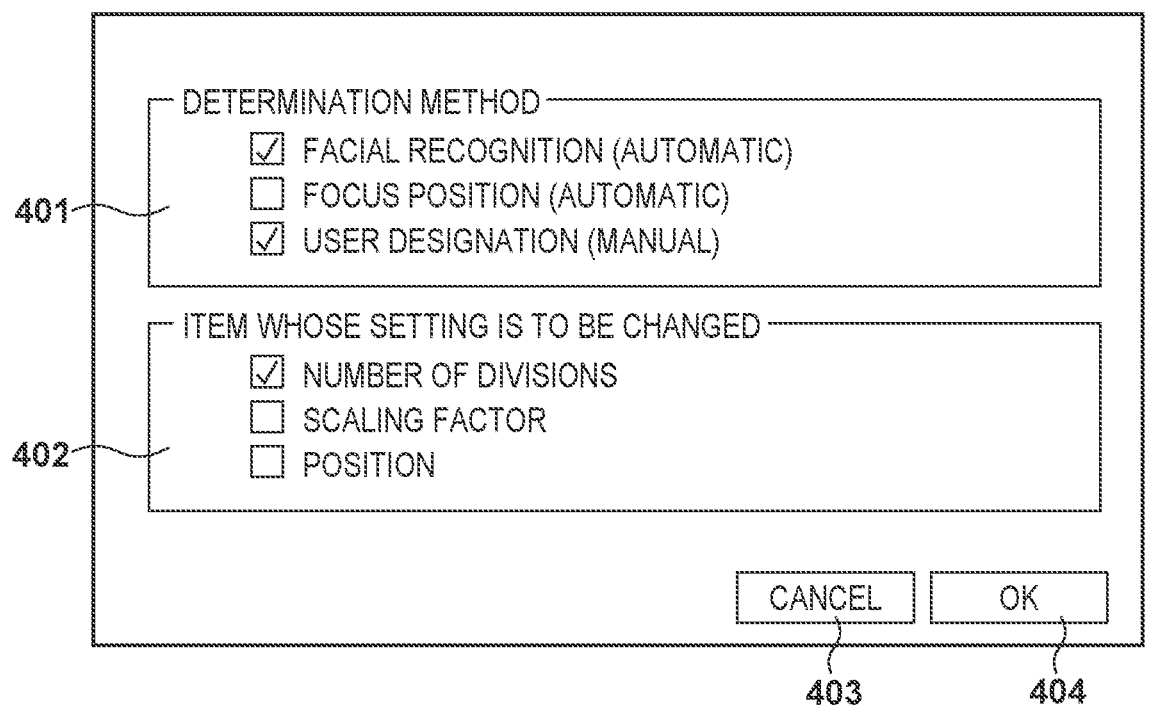
FIG. 4 is a diagram showing an example of a screen configuration for selecting an item for which the automatic adjustment of settings is to be applied.

FIG. 3 shows a display example for a case where the enlargement/reduction factor automatic adjustment button 211 (also referred to as the automatic adjustment button 211) has been depressed and an OK button 304 shown in FIG. 4 has been depressed in a state where the settings corresponding to the display shown in FIG. 2B have been configured for the respective setting items. Once the application software 101 has recognized that the enlargement/reduction factor automatic adjustment button 211 has been pressed and the OK button 304 has been pressed, it changes the original setting values of the respective setting items, and displays an image 214, that is to say, a preview, after the change of the settings in the preview region 202. Regarding the respective setting items after the change, they have been changed to setting values with which, for example, the image dividing lines as much as possible do not overlap a main subject region. That is to say, the setting values are adjusted so that the main subject region is as much as possible not divided. In other words, the setting values are adjusted based on the position of the main subject region so that the main subject region is at least included in a portion other than an edge region in a post-division image. It is also desirable that, in the main subject region, the percentage of a portion that wraps around the side surfaces of a frame in the course of gallery-wrapping be as small as possible. The following describes some embodiments in relation to an information processing apparatus and a program that are each exemplarily embodied as an information processing system having the above-described configuration. Note that a main subject region is an expression based on the assumption that a target image is a photograph. However, as a target image according to the embodiments is not limited to being a photograph, a main subject region can be more generally referred to as a main portion or a main region of the image, but the term main subject region is used in the following description, whether the image is a photograph or not. Furthermore, the wording "include(s) as much of a main subject region as possible" is used in some cases; this means that, in the main subject region, a portion that appears on a front surface of a frame is as large as possible in the case of gallery-wrapping. With a gallery wrap, an edge portion (an edge region) of each divided image is located on the side surfaces of a frame. Note that the edge region may not be printed so that it is located on the side surfaces of a frame. For example, in some modes, the edge region may not be printed. That is to say, as described above, according to the present embodiment, the setting values are changed so that, in a main subject region of an image, the percentage of a portion other than a side-surface portion thereof is as high as possible.

Processing for Automatic Adjustment of Print Settings (Settings Adjustment Method)

A description is now given of processing of a case where a setting change in automatic adjustment of settings is applied by depressing the enlargement/reduction factor automatic adjustment button 211 in a state where no particular numerical values have been set in the division number input region 208, the position input region 209, and the enlargement/reduction factor input region 210. In accordance with the depression of the enlargement/reduction factor automatic adjustment button 211, the applications 101 execute predetermined processing with respect to a designated image, apply the settings after the automatic adjustment in the image, and display the image in the preview region 202 via the monitor 106. It is desirable that the settings after the automatic adjustment be such that, for example, a front-surface portion of a frame includes as much of a main subject region as possible. This also means that, in the image in which the adjusted settings have been applied, a single main subject region is as much as possible not divided. However, the settings after the adjustment are not always the settings with which a main subject region is not divided at all, due to the relationships among the entirety of the image, the main subject region, and the way in which the image is divided.

FIG. 4 is a diagram showing one example of an item selection screen which is displayed when the enlargement/reduction factor automatic adjustment button 211 has been depressed, and which is for selecting a method of determining a main subject region and an item whose setting is to be changed. This selection screen includes a method selection region 401 for designating a method of determining a main subject region, an item selection region 402 for selecting an item for which a setting change is to be permitted, a cancel button 403, and an OK button 404. Here, with regard to an item for which a setting change is to be permitted, a range to be permitted may be settable in addition to the designation of the item. For example, when a setting change is to be permitted for the number of divisions, the maximum number of divisions and the minimum number of divisions may be settable for each of the vertical and horizontal directions. Also, using the designated value as the median, the number that can be subtracted therefrom and the number that can be added thereto may be settable for each of the vertical and horizontal directions. Furthermore, with regard to the enlargement/reduction factor as well, the range of the permitted adjustment may be able to be designated by, for example, setting the rates corresponding to the permitted fluctuation using the designated value as the median. With regard to the position as well, the amount of fluctuation from the designated position may be able to be designated by the number of pixels, the ratio to the size of the entirety of the image, and the like for each of the vertical and horizontal directions, for example.

Figure 5B:
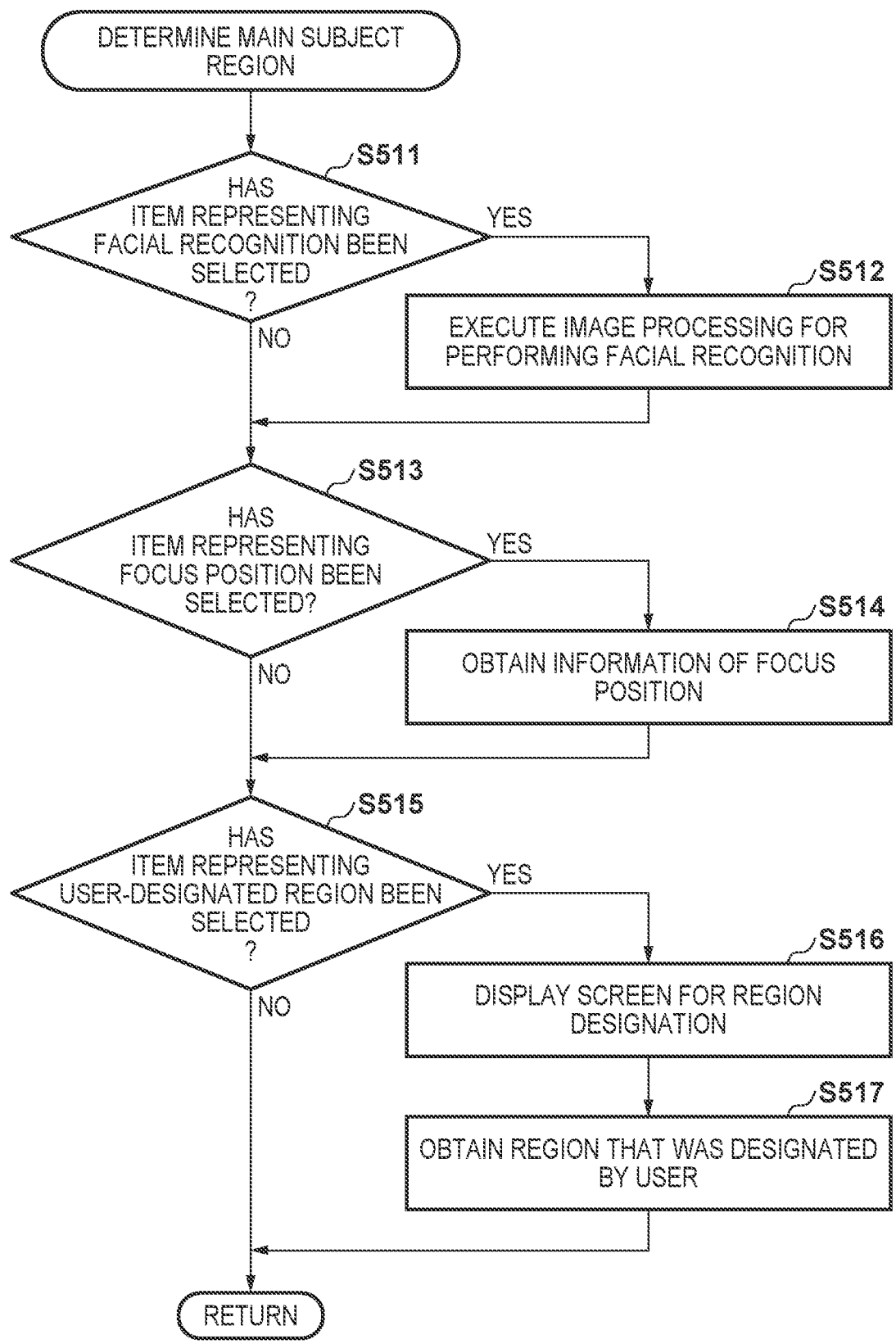

FIG. 5A and FIG. 5B are flowcharts for displaying the image 214 after the setting values of the image displayed in the preview region 202 have been changed in accordance with the items selected in the method selection region 401 and the item selection region 402. When the OK button 403 has been depressed in a state where at least one has been selected in each of the method selection region 401 and the item selection region 402, processing of the flowchart of FIG. 5A is started from step S501. Note that upon depression of the OK button 403, the setting values at that point are stored. Although the following description is provided as if the input to the user interface of FIG. 4 is referred to for convenience, the setting values stored in, for example, the RAM 109 are referred to. Also, the flowcharts of FIG. 5A and FIG. 5B are realized by the CPU 108 executing the application software 101 loaded in the RAM 109. Although the following description is provided assuming that the application software is the main agent, the main executor thereof is the CPU 108 (i.e., a processor).

In step S502, the application software 101 obtains an item representing a method of determining a main subject region selected in the method selection region 401.

In step S503, the application software 101 specifies a main subject region in accordance with the selected method of determining the main subject region. In the present example, the method of determining the main subject region can be selected from among facial recognition, a focus position, and a user designation. However, there are other commonly-known image processing and recognition methods, and these methods may be used as options. Through step S503, the position and the range of the main subject region in the entirety of the image are specified. The details of step S503 are shown in FIG. 5B.

In step S511 of FIG. 5B, the application software 101 determines whether an item representing facial recognition has been selected in the method selection region 401. In a case where the item representing facial recognition has been selected, image processing for performing facial recognition is executed in step S512. Facial recognition may be performed using a commonly-known method. In facial recognition mentioned here, there is no need to specify an individual, and it is sufficient to be able to specify a region including a human face.

In step S513, the application software 101 determines whether an item representing a focus position has been selected in the method selection region 401. In a case where the item representing the focus position has been selected, information of a focus position is obtained from image information in step S514. The focus position may be specified using a known method. For example, the image is divided into certain regions, the modulation transfer function (MTF) curve is obtained in each divided region, and a region in which a certain amount of spatial frequency components exist in a high band is specified as a focus region.

In step S515, the application software 101 determines whether an item representing a user-designated region has been selected in the method selection region 401. In a case where the item representing the user-designated region has been selected, a screen for region designation is displayed and a user-designation operation is accepted in step S516. In step S517, the region that was designated by a user in step S516 is obtained. It is sufficient to perform the user designation using a method in which, for example, a target image is displayed on a window, a predetermined angular point of a quadrilateral region is designated on a screen thereof, and a diagonal point is designated via, for example, a drag-and-drop operation using the predetermined angular point as a base point. It goes without saying that the designation may be performed using other methods. Furthermore, a plurality of regions may be designated.

Note that in FIG. 5B, if no method has been selected, a method of specifying a main subject is not designated; however, a predetermined method that has been set in advance may be selected in a case where no specification method has been designated. The predetermined method may be one of the options; for example, it may be facial recognition. In the above-described manner, the method of specifying the main subject region in step S503 is decided on in the procedure of FIG. 5B.

Returning to FIG. 5A, in step S504, the application software 101 decides on the main subject region with use of the method determined in step S503. In step S505, the application software 101 determines a numerical representation of the main subject region that was decided on in step S504. In determining the numerical representation, for example, the size of the main subject region, such as the number of pixels included therein, may be obtained and the value thereof may be used as a numerical value of the main subject region. This numerical value is also referred to as a weight.

In step S506, the application software 101 obtains an item for which a setting change has been permitted, which was selected in the item selection region 402. In a case where the permitted range has been designated, this range is also obtained. Note that in a case where no item has been selected, no setting item may be changed as designated. However, in this case, the automatic adjustment of setting values is difficult, and thus the number of divisions, the reduction factors, or the position may be set as a predetermined item for which a setting change is permitted. In this case, a selected item may be prioritized if present, and the predetermined item may be applied only in a case where no item has been selected. Furthermore, regarding the predetermined item, the range of values that are permitted to be changed may also be set in advance. For example, every item may be set as the predetermined item.

In step S507, the application software 101 changes the item whose setting is to be changed, which was selected in step S506, and makes an adjustment to achieve the settings with which a front-surface portion of a frame includes as much of the main subject region as possible in step S505. Therefore, in the present embodiment, the new settings with which the main subject region of the image is as much as possible not divided are decided on, and the existing settings are changed to the new settings that have been decided on. In this way, the dividing lines of image regions do not overlap the main subject region, thereby reducing the regions that correspond to the side-surface portion of the frame after gallery-wrapping.

In step S508, the application software 101 changes the image settings to the setting values that were decided on in step S507. The flowcharts of FIG. 5A and FIG. 5B end in a state where the image 214, in which the changed setting values have been applied, is displayed in the preview region 202.

Method of Adjusting Setting Values

Here, the method of adjusting the setting values, that is to say, the method of deciding on the settings in step S507, may be the procedures described below, for example.

1. First of all, in accordance with the settings of the settings region 204, that is to say, the unchanged, original settings, the base position is decided on first in accordance with the designated position, variable magnification of the target image is performed using the designated magnification factor, and the target image is divided using the designated division method. Note, it is assumed that each region after the division has the same shape.

2. Whether a main subject region has been divided as a result of the first process is determined. As the position and the range of the main subject region have been specified in step S503, this determination is made after the position of the main subject region has been moved in accordance with the designated image position and variable magnification of its range has been performed in accordance with the variable magnification factor. For example, assume that the position of the point on the upper-left corner of the image is represented as the base position (0, 0). Also, assume that the base position designated in the settings region 204 is (x, y), and the position of the main subject region, for example, the position of the point on the upper-left corner thereof is (xr, yr). In this case, (x, y) is used as the new origin (0, 0), and (xr−x, yr−y) is used as the new position of the main subject region. Furthermore, provided that the designated variable magnification factor is m, the position after the variable magnification may be (m(xr−x), m(yr−y)). When this has been applied similarly to, for example, the point on the lower-right corner of the main subject region as well, both of the start point and the end point of the outline that defines the main subject region can be decided on.

Meanwhile, it is sufficient to determine the dividing lines in such a manner that, using the image after the change of the position and magnification factor as a target, this image is equally divided by the designated number of divisions in each of the vertical and horizontal directions of this image. Whether the outline of the main subject region and the image dividing lines that have been obtained in the foregoing manner intersect is determined. If it is determined that they do not intersect, the setting values need not be changed; the setting values are not changed in step S508, and the setting values set in the settings region 204 are stored as is.

3. In a case where it has been determined that the outline of the main subject region and the image dividing lines intersect in the second process, the setting values with which the main subject region is not divided are specified by changing the values of setting items that are permitted to be changed. In a case where it has been determined that avoiding the division of the main subject region is difficult, the settings that make the percentage of a portion that appears on a front surface of a frame (herein referred to as a front-surface rate) in the main subject region as high as possible (the highest if possible) are specified. In a divided gallery wrap according to the present embodiment, each image after the division is bound in such a manner that a region thereof having a predetermined width from an edge thereof is fastened to the side surfaces of the frame. The aforementioned front-surface rate denotes the percentage that a region other than a region corresponding to the side surfaces of the frame accounts for in the main subject region included in the pre-division image.

4. To this end, first of all, the setting items whose setting values are permitted to be changed, that is to say, the items selected in the item selection region 402, are specified. If there is no selected item, the setting values are not changed, and the setting values set in the settings region 204 are stored as is.

5. If there are setting items that are permitted to be changed, an item for which a setting change is to be attempted is decided on from among these setting items. If there is one setting item whose setting values are permitted to be changed, this item is decided on. In a case where there are a plurality of such setting items, an item is specified in accordance with, for example, priority degrees that have been determined in advance. If the size of the main subject region in the vertical or horizontal direction is larger than the size of a single divided region in the vertical or horizontal direction, the division of the main subject region cannot be avoided by moving the position. In view of this, first, the variable magnification factor (i.e., the enlargement/reduction factor) is used as an item that is given the utmost priority as a target of change. Also, as the divided gallery wrap involves binding images such as photographs on the frame, it is thought that the division method has been decided on in consideration of the size and the aspect ratio of the frame. For this reason, the number of divisions may be given the lowest priority degree. Therefore, the position is used as the target of change next to the enlargement/reduction factor. It goes without saying that the way in which these priority degrees are given is one example, and furthermore, there can be methods in which the priority degrees are not given in particular.

6. In view of this, first of all, if the enlargement/reduction factor is permitted to be changed, the settings of the enlargement/reduction factor are adjusted. With regard to each main subject region, the rate of the size thereof in the vertical direction with respect to the size of each region after the division in the vertical direction (the main subject region rate) is specified. Similarly, with regard to each main subject region, the main subject region rate of the size thereof in the horizontal direction with respect to the size of each region after the division in the horizontal direction is specified. Among the main subject region rates of the respective main subject regions in the vertical and horizontal directions that have been obtained in the foregoing manner, the highest rate that exceeds one is used as a base, the reduction factor is decided on so that this highest rate becomes one, and the image is reduced using this reduction factor. A value obtained by multiplying this reduction factor by the set enlargement/reduction factor is used as the reduction factors (variable magnification factor) after the setting change. Note that if there is no main subject region rate that exceeds one, the setting values of the enlargement/reduction factor need not be changed because the main subject region has a size that fits in a single divided region.

7. After the setting of the enlargement/reduction factor has been completed, in a case where the movement of the image is permitted, the position (base position) of the image is moved next in such a manner that the dividing lines do not overlap a main subject region. The range of the movement may be limited to a range in which the image after trimming does not extend beyond the original image before trimming. For example, provided that the original image has been trimmed to remove xu rows on the upper side and yl columns on the left side, the range of the movement is limited to xu lines upward and yl columns leftward. In a case where the image has been enlarged in the sixth process, the range of the movement may include the region that has been removed through trimming along with the enlargement. The movement is performed in such a manner that a region other than the main subject region (referred to as another region herein) includes a dividing line and the amount of movement is minimal.

For this reason, for example, in a case where a dividing line in the vertical direction overlaps the main subject region, the vertical line of the outline of the main subject region close to this dividing line is decided on, and the image is moved so that the dividing line moves toward the vertical line of the outline that has been decided on. It is desirable that the amount of movement at this time be an amount with which the dividing line is outside the main subject region and the main subject region is not located on the side surfaces of the divided gallery wrap. Note that in a case where the interval between the pertinent main subject region and another main subject region adjacent thereto is smaller than double the width of the side surfaces of the gallery wrap, the image is moved so that a dividing line is located at the intermediate position of this interval. Regarding this, in a case where there is a dividing line in the horizontal direction as well, the direction of movement and the amount of movement are similarly decided on with respect to this dividing line. As a result, the percentage of the portion of the main subject region that fits in the front surface of the frame after gallery-wrapping can be made as high as possible.

Note that when a plurality of main subject regions are included in the image, the movement of the image could possibly cause a main subject region that did not overlap a dividing line before the movement to overlap a dividing line after the movement. In this case, the image may not be moved. Alternatively, the movement may be cancelled out to restore the original condition.

8. Finally, if a dividing line still overlaps a main subject region even after the aforementioned processes and the division method is permitted to be changed, an attempt is made to change the division. As the object is to prevent a dividing line from overlapping the main subject region, the change may be made only with respect to the direction in which the number of divisions is reduced (i.e., each divided region is enlarged). Also, as the purpose of the divided gallery wrap is lost if the division is not performed, the smallest number of divisions may be set at two, for example. Furthermore, if the number of divisions under the original settings is one, this need not be increased. Therefore, if the original setting value is one (no division) or two, this setting is not changed.

In view of this, first, whether the current number of divisions in the horizontal direction is two or less is determined; if the number is two or less, processing is ended here, and the current setting values are stored as the changed setting values in step S508. If the number of divisions is larger than two, the number of divisions is reduced one by one, and whether the main subject region overlaps a dividing line in the vertical direction is determined; if there is an overlap, the number of divisions is further reduced, and the same determination is repeated. This is performed until the number of divisions becomes two. Consequently, if a dividing line in the vertical direction and the main subject region do not overlap, the resultant number of divisions is used with respect to the division in the horizontal direction. If there is no number of divisions that prevents a dividing line in the vertical direction and the main subject region from overlapping, the number of divisions in the horizontal direction is not changed from the original setting.

On the other hand, with respect to a dividing line in the horizontal direction as well, if the number of divisions is larger than two, the number of divisions is reduced and whether a dividing line and the main subject region overlap is determined in a similar manner. Consequently, if a dividing line in the horizontal direction and the main subject region do not overlap, the resultant number of divisions is used with respect to the division in the vertical direction. If there is no number of divisions that prevents a dividing line in the horizontal direction and the main subject region from overlapping, the number of divisions in the vertical direction is not changed from the original setting.

9. The enlargement/reduction factor (variable magnification factor), the position, and the number of divisions that have been decided on in the foregoing manner are stored in step S508. Note that the foregoing procedures are merely exemplary, and each setting value may be adjusted in other procedures.

10. Note that the change of the division method may not be made only in the eighth process, and may be combined with the sixth and subsequent processes. For example, if a dividing line and a main subject region overlap even after the number of divisions has been reduced with respect to the vertical or horizontal direction in the eighth process, the sixth and subsequent processes may be repeatedly executed using this division method. That is to say, the enlargement/reduction factor and the position of the image are adjusted in a state where the division method has been changed, so as to search for the settings that prevent a dividing line and the main subject region from overlapping. This is repeated until the settings that prevent a dividing line and the main subject region from overlapping are found, or the number of divisions becomes the smallest (=2).

As described above, according to the present embodiment, a main subject region is decided on in step S506 of FIG. 5A, and the application software 101 performs a setting change to attain the setting values with which the main subject region is as much as possible not divided in steps S507 and S508. Consequently, the adjustment is made to attain the settings with which a front-surface portion of a frame after gallery-wrapping includes as much of the main subject region as possible. This can solve the problem that the adjustment of settings requires effort, and can cause a main subject region that is considered to be valued by a user to be undivided as much as possible, and further to be situated on a front surface as much as possible.

Figure 7:
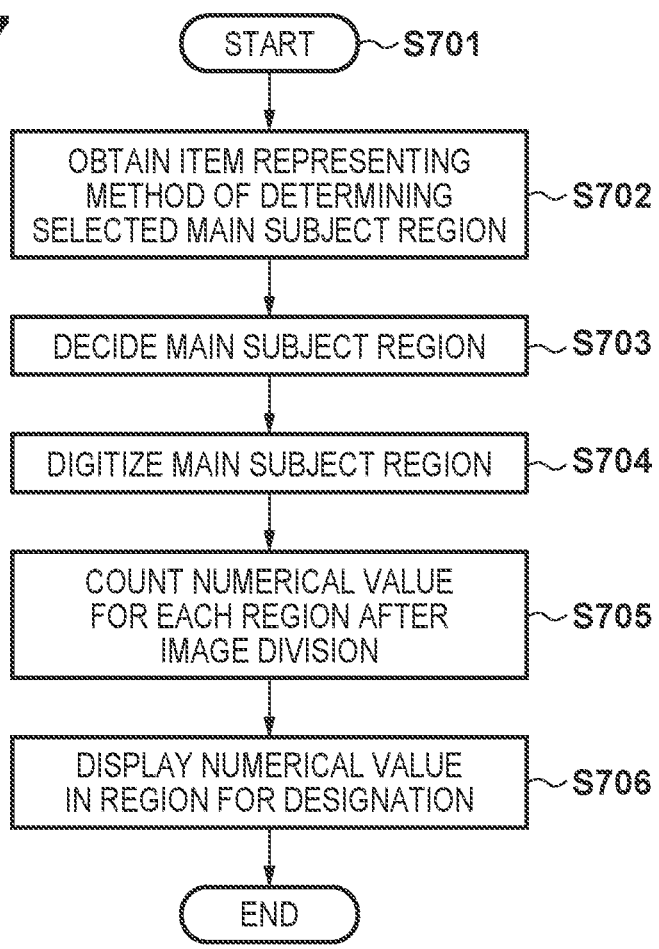
FIG. 7 is a flowchart for displaying a numerical value indicating a numerical representation of a main subject region for each divided image.

Note that following the above-described procedures, variable magnification of the image is performed and the image is trimmed and divided in accordance with the setting values that were decided on in the procedure of FIG. 7, and the printer 105 prints each divided image. The image obtained as a result of the foregoing is bound on the frame in the gallery wrap style. The arrangement in the image after gallery-wrapping is such that the largest possible part of the entirety of the main subject region is located on the front surface as has been assumed during the adjustment of settings. Furthermore, division of a single subject region in correspondence with a plurality of frames is prevented as much as possible.

Second Embodiment

In the first embodiment, the preview region 202 may be provided with a numerical value display region 215 that displays a numerical value indicating a numerical representation of a main subject region. The displayed numerical value indicates the value, the percentage, or the like of a portion corresponding to a front surface after gallery-wrapping in the main subject region. In this case, the settings region 204 may be provided with a numerical value display checkbox 216 with which the numerical value is switched between a displayed state and a non-displayed state. The numerical value may be displayed using a value for which the base has been determined by an application, or may be displayed using a commonly-known method of numerical value display/expression, for example, with use of a percentage in the entirety of the main subject region. Furthermore, the numerical value may be displayed with respect to each of the divided images, or the numerical value may be displayed with respect to all of the images.

FIG. 6A is a diagram showing an example of a state where the numerical value display checkbox 216 shown in FIG. 2A and the like has been checked and the numerical value display region 215 is displayed. FIG. 6B is a diagram showing a state where, as a result of recognizing the depression of the OK button 404 and applying the automatic adjustment of settings, 98 percent of the main subject region is included in a front-surface portion after gallery-wrapping.

FIG. 6C and FIG. 6D are diagrams showing the numerical value of the main subject region using the numerical value for which the base has been determined by an application (also referred to as weights), rather than showing the states of FIG. 6A and FIG. 6B using the percentage of inclusion of the main subject region. This numerical value may be, for example, the number of pixels of the main subject region included in each divided region. Also, both of the percentage of the main subject region included in the front surface and the number of pixels of the main subject region may be displayed.

FIG. 7 is a flowchart for displaying a numerical value indicating a numerical representation of a main subject region for each divided image in a case where the automatic adjustment of settings has been applied in a state where the numerical value display setting checkbox 216 has been checked. Processing of the flowchart of FIG. 7 is started when the OK button 404 of the setting automatic adjustment item selection screen shown in FIG. 4 has been depressed in a state where the numerical value display setting checkbox 216 has been checked. A target image is an image for which the position, the magnification factor, and the number of divisions have been set in accordance with the settings.

In step S702, the application software 101 obtains, from the RAM 109, an item representing a method of determining a main subject region selected in the selection region 401 for the method of determining the main subject region.

In step S703, the application software 101 determines a main subject region with use of the main subject region determination method selected in step S702.

In step S704, the application software 101 determines a numerical representation of the main subject region that was decided on in step S703. This numerical value may be, for example, the total number of pixels included in the main subject region.

Figure 9:
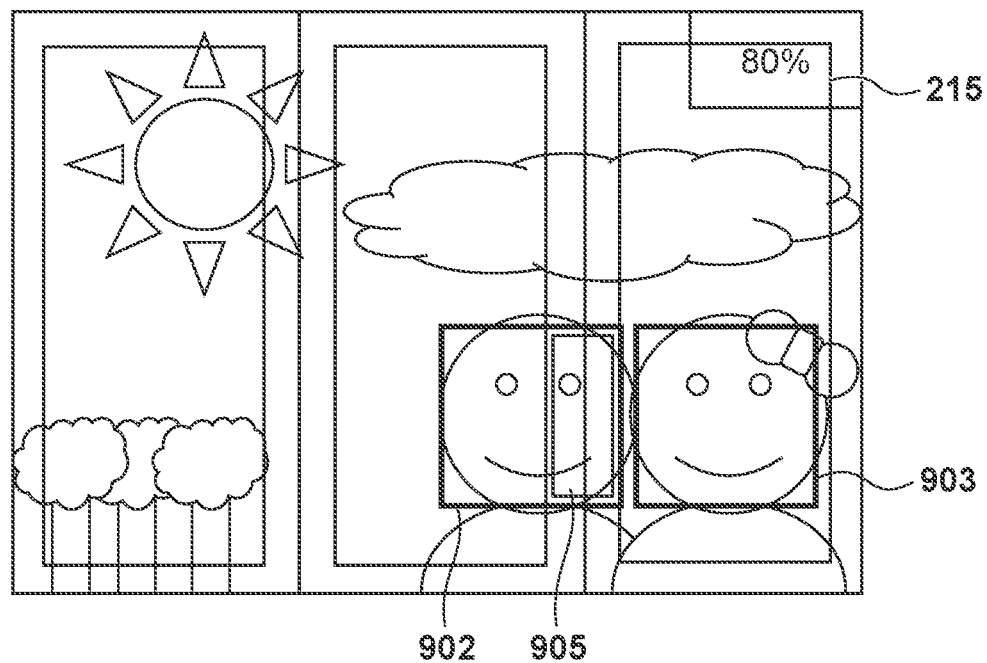
FIG. 9 is a diagram showing an example of image division for a divided gallery wrap.

In step S705, the application software 101 counts a number for each region after the image division with use of the CPU 108 based on the numerical value indicating the numerical representation of the main subject region obtained in step S704. This numerical value may be, for example, the total number of pixels included in a region other than a portion of the divided image region corresponding to the side surfaces of a frame, among the number of pixels included in the main subject region. As the width of the side surfaces of the frame may be a predetermined value that has been designated separately, the number of pixels of the main subject region included in a region having that width from an edge portion of the divided region is subtracted from the total number of pixels included in the main subject region. FIG. 9 shows one example thereof. A region 901 is a region located on the front surface of the frame after gallery-wrapping, and an edge portion therearound corresponds to the side surfaces of the frame. Among main subject regions 902 and 903, a region 905 is a region corresponding to the side surfaces; in step S705, a value obtained by subtracting the number of pixels in the region 905 from the number of pixels in the main subject regions 902 and 903 is attained.

In step S706, the application software 101 displays the numerical value calculated in step S705 in the display region 215 for the numerical value of the main subject region via the monitor 106. Note that in FIG. 9, the display region 215 displays the percentage of the portion that corresponds to the front surface after gallery-wrapping in the main subject region. In this case, it is sufficient to display, in the display region 215, a value obtained by dividing the number of pixels in the main subject region corresponding to the front surface of the frame obtained in step S705 by the number of pixels in the main subject region obtained in step S704.

The flowchart of FIG. 7 ends in a state where the numerical value is displayed in the display region 215 for the numerical value of the main subject region.

Figure 8:
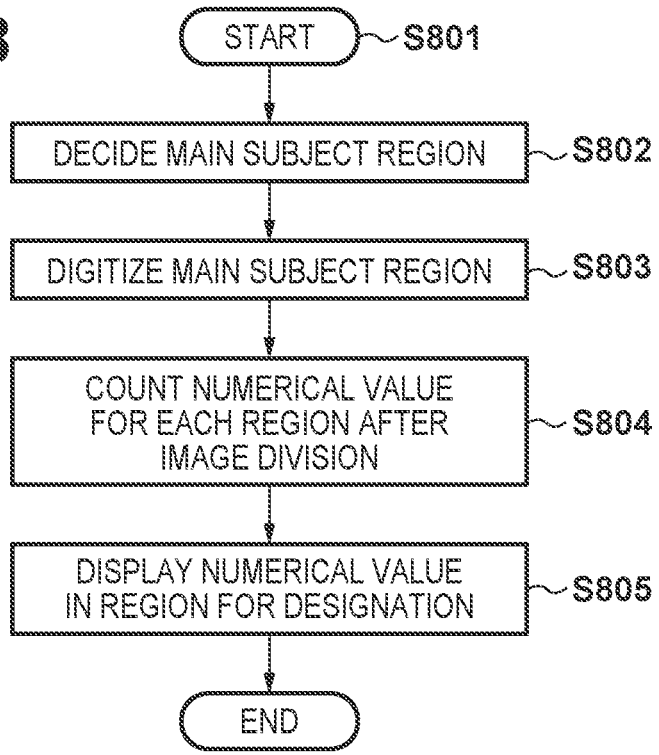
FIG. 8 is a flowchart for displaying a numerical value indicating a numerical representation of a main subject region.

FIG. 8 is a flowchart for displaying a numerical value indicating a numerical representation of a main subject region in a case where the numerical value display setting checkbox 216 has been checked in a state where the automatic adjustment of settings described in the first embodiment has been applied. Processing of the flowchart of FIG. 8 is started when the numerical value display setting checkbox 216 has been depressed in the state where the automatic adjustment of settings has been applied. A target image is an image for which the position, the magnification factor, and the number of divisions have been set in accordance with the settings; however, in a case where FIG. 7 is executed after the execution of FIG. 5A and FIG. 5B, a target image is an image that has been adjusted in accordance with the settings that have been changed in the procedures of FIG. 5A and FIG. 5B.

In step S802, the application software 101 obtains, from the RAM 109, a main subject region that has been decided on via the selection region 401 for the method of determining the main subject region and the selection region 402 for items whose settings are to be changed. The following steps S803 to S805 are similar to steps S704 to S706 of FIG. 7.

In step S803, the application software 101 determines a numerical representation of the main subject region obtained in step S802. In step S804, the application software 101 counts a numerical value for each region after the image division with use of the CPU 108 based on the main subject region for which the numerical representation was determined in step S803. In step S805, the application software 101 displays the numerical value calculated in step S804 in the display region 215 for the numerical value of the main subject region via the monitor 106.

The flowchart of FIG. 8 ends in a state where the numerical value is displayed in the display region 215 for the numerical value of the main subject region.

As a result of displaying the numerical value of the main subject region in the above-described procedures, a user can confirm not only the appearance of the image, but also the display state of the main subject region with the numerical representation, especially the display state after gallery-wrapping. This enables comparison between display states based on numerical values in a case where, for example, different settings are tested and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-005348, filed Jan. 17, 2022 which is hereby incorporated by reference herein in its entirety.

What is claimed is:

1. A control method for an information processing apparatus, the control method comprising:
receiving a designation of a number of divisions of an image from a user;
specifying a specific region in the image;
after the image has been divided by a number of divisions equal to a first number due to a designation of the number of divisions equal to the first number having been received from the user, executing predetermined processing related to a number of divisions equal to a second number different from the first number that is the number of divisions from the designation received from the user based on at least one of (a) whether the specific region specified is divided by the dividing, into the number of divisions equal to the first number, of the image, and (b) a percentage that a front-surface portion region, corresponding to a front-surface portion of a frame to which a print product is attached, in each of the first number of divided images corresponding to the image divided by the number of divisions equal to the first number accounts for in the specific region specified; and
after the predetermined processing has been executed, executing processing for obtaining the print product by printing a plurality of divided images corresponding to the image that has been divided.

2. The control method according to claim 1, wherein a percentage that the front-surface portion region of each of the second number of divided images, which correspond to the image that has been divided by the number of divisions equal to the second number, accounts for in the specific region is higher than a percentage that the front-surface portion region of each of the first number of divided images, which correspond to the image that has been divided by the number of divisions equal to the first number, accounts for in the specific region.

3. The control method according to claim 2, wherein each of the plurality of divided images further includes an edge region corresponding to a side-surface portion of the frame.

4. The control method according to claim 1, wherein the processing related to the number of divisions equal to the second number is processing for displaying the plurality of divided images obtained through a division by the second number.

5. The control method according to claim 1, wherein the processing related to the number of divisions equal to the second number is processing for changing a setting value related to the number of divisions of the image from the first number to the second number.

6. The control method according to claim 1, wherein the specific region is a region specified by image processing of facial recognition.

7. The control method according to claim 1, wherein the specific region is a region specified by a designation of a region by the user.

8. The control method according to claim 1, wherein the specific region is a region specified based on a focus position.

9. The control method according to claim 1, further comprising receiving, from the user, a selection of one of a plurality of specification methods that are methods of specifying the specific region,
wherein the specific region is a region specified by the selected specification method, and
wherein the plurality of specification methods include at least one of a method of specification by way of image processing of facial recognition, a method of specification by way of a designation of a region by the user, and a method of specification based on a focus position.

10. The control method according to claim 1, wherein the plurality of divided images are images for gallery wrap printing.

11. The control method according to claim 1, wherein in a case where the designation of the number of divisions equal to the first number has been received from the user and a predetermined operation for making an automatic adjustment to the number of divisions has been received, the processing related to the number of divisions equal to the second number is executed.

12. The control method according to claim 11, wherein in a case where the designation of the number of divisions equal to the first number has been received from the user, processing for displaying the first number of the divided images is executed, and
wherein in a case where a predetermined operation for making an automatic adjustment to the number of divisions has been received after the processing for displaying the first number of the divided images has been executed, the processing related to the number of divisions equal to the second number is executed.

13. The control method according to claim 1, further comprising:
after the designation of the number of divisions equal to the first number has been received from the user, displaying a numerical value corresponding to a percentage that the front-surface portion in each of the first number of the divided images accounts for in the specific region.

14. The control method according to claim 1, further comprising:
after the predetermined processing has been executed, displaying a numerical value corresponding to a percentage that the front-surface portion in each of the second number of divided images accounts for in the specific region.

15. The control method according to claim 1, wherein in the predetermined processing, at least one of an enlargement/reduction factor of the image and a position of the specific region is changed.

16. An information processing apparatus comprising:
   at least one processor; and
   at least one memory storing at least one program that causes the at least one processor to
   (1) receive a designation of a number of divisions of an image from a user;
   (2) specify a specific region in the image;
   (3) after the image has been divided by a number of divisions equal to a first number due to a designation of the number of divisions equal to the first number having been received from the user, execute predetermined processing related to a number of divisions equal to a second number different from the first number that is the number of divisions from the designation received from the user based on at least one of (a) whether the specific region specified is divided by the dividing, into the number of divisions equal to the first number, of the image, and (b) a percentage that a front-surface portion region, corresponding to a front-surface portion of a frame to which a print product is attached, in each of the first number of divided images corresponding to the image divided by the number of divisions equal to the first number accounts for in the specific region specified; and
   (4) after the predetermined processing has been executed, execute processing for obtaining the print product by printing a plurality of divided images corresponding to the image that has been divided.

17. A non-transitory computer-readable storage medium storing a program which, when loaded into a computer and executed, causes the computer to execute a process, the process comprising:

receiving a designation of a number of divisions of an image from a user;

specifying a specific region in the image;

after the image has been divided by a number of divisions equal to a first number due to a designation of the number of divisions equal to the first number having been accepted from the user, executing predetermined processing related to a number of divisions equal to a second number different from the first number that is the number of divisions from the designation received from the user based on at least one of (a) whether the specific region specified is divided by the dividing, into the number of divisions equal to the first number, of the image, and (b) a percentage that a front-surface portion region, corresponding to a front-surface portion of a frame to which a print product is attached, in each of the first number of divided images corresponding to the image divided by the number of divisions that is equal to the first number accounts for in the specific region specified; and after the predetermined processing has been executed, executing processing for obtaining the print product by printing a plurality of divided images corresponding to the image that has been divided.

* * * * *